(12) United States Patent
Jeong

(10) Patent No.: US 11,679,705 B2
(45) Date of Patent: Jun. 20, 2023

(54) VEHICLE HEADREST FOLDING DEVICE

(71) Applicant: WOOBO TECH CO., LTD., Pyeongtaek-si (KR)

(72) Inventor: Hae Il Jeong, Incheon (KR)

(73) Assignee: Woobo Tech Co., Ltd., Pyeongtaek-si (KR)

( * ) Notice: Subject to any disclaimer, the term of this patent is extended or adjusted under 35 U.S.C. 154(b) by 148 days.

(21) Appl. No.: 17/424,298

(22) PCT Filed: Jan. 16, 2020

(86) PCT No.: PCT/KR2020/000772
§ 371 (c)(1),
(2) Date: Jul. 20, 2021

(87) PCT Pub. No.: WO2020/153656
PCT Pub. Date: Jul. 30, 2020

(65) Prior Publication Data
US 2022/0089075 A1    Mar. 24, 2022

(30) Foreign Application Priority Data
Jan. 21, 2019   (KR) .................. 10-2019-0007695

(51) Int. Cl.
*B60N 2/856* (2018.01)
*B60N 2/838* (2018.01)
*B60N 2/841* (2018.01)
*B60N 2/844* (2018.01)

(52) U.S. Cl.
CPC .............. *B60N 2/856* (2018.02); *B60N 2/838* (2018.02); *B60N 2/841* (2018.02); *B60N 2/844* (2018.02)

(58) Field of Classification Search
CPC ........ B60N 2/856; B60N 2/838; B60N 2/841; B60N 2/844; B60N 2/853
USPC .......................................................... 297/408
See application file for complete search history.

(56) References Cited

U.S. PATENT DOCUMENTS

| | | | |
|---|---|---|---|
| 10,427,572 B2 * | 10/2019 | Jeong | B60N 2/844 |
| 10,836,289 B2 * | 11/2020 | Jeong | B60N 2/856 |
| 2009/0250981 A1 | 10/2009 | Matsui | |
| 2015/0266401 A1 | 9/2015 | Grable | |
| 2020/0070700 A1 * | 3/2020 | Jeong | B60N 2/856 |
| 2020/0238871 A1 * | 7/2020 | Inadome | B60N 2/841 |
| 2021/0316645 A1 * | 10/2021 | Jeong | B60N 2/856 |

FOREIGN PATENT DOCUMENTS

| | | |
|---|---|---|
| KR | 10-1428664 B1 | 8/2014 |
| KR | 10-2018-0026908 | 3/2018 |
| KR | 10-1837428 B1 | 3/2018 |
| KR | 10-191916 | * 11/2018 |

OTHER PUBLICATIONS

International Searching Authority/KR, International Search Report and Written Opinion of the International Searching Authority, Application No. PCT/KR2020/000772, dated May 13, 2020, 6 pages.

* cited by examiner

*Primary Examiner* — Robert Canfield
(74) *Attorney, Agent, or Firm* — Sunstein LLP

(57) ABSTRACT

This invention relates to a headrest folding device having a simple locking and unlocking structure, wherein a locking bar of a lifting slider is disposed directly under a locking groove of an upper latch, and stably guiding vertical linear sliding of the lifting slider.

11 Claims, 19 Drawing Sheets

70b   70a

VEHICLE HEADREST FOLDING DEVICE

This application is the national phase entry of international patent application no. PCT/KR2020/000772, filed Jan. 16, 2020 and claims the benefit of Korean patent application No. 10-2019-0007695, filed Jan. 21, 2019, the disclosures of which are incorporated herein by reference in their entirety.

TECHNICAL FIELD

This invention relates to a headrest folding device in which a locking bar of a lifting slider is disposed directly under a locking groove of an upper latch so that a locking and unlocking structure is simple and which stably guides vertical linear sliding of the lifting slider.

BACKGROUND ART

A headrest folding device is proposed as a conventional headrest folding device that is disclosed in a patent document (Korean Patent Publication No. 10-1428664) which is registered and filed by the present applicant.

As illustrated in FIGS. 17 to 21, the headrest folding device of the patent document includes a first member 100 connected to a headrest, a second member 270 connected to a seat and rotatably installed on the first member 100, a main spring 300 which is disposed between and connected to the first member 100 and the second member 270 and applies an elastic force to the first member 100 and the second member 270 to move the headrest to a second position (hereinafter, referred to as a front position, which is a folded position), and a locking member 600 which is installed on the second member 270, is disposed in a direction opposite the second position with respect to the first member 100 to be in contact with the first member 100, and fixes the headrest to a first position (hereinafter, referred to as an upright position), an inclined surface 611 is formed on a contact surface, which is in contact with the first member 100, of the locking member 600, the locking member 600 and the first member 100 are in contact with each other on at least one portion of the inclined surface 611 when the headrest is positioned in the upright position, and the locking member 600 is vertically slidably installed in the second member 270.

The second member 270 includes front surfaces 272 and sidewalls 271 installed at both sides of the front surfaces 272.

First through holes 278 through which a horizontal rod 103 of the first member 100 passes are formed in the sidewalls 271.

Coupling pieces 276 are formed to protrude outward from the sidewalls 271. The second member 270 is installed on the seat using the coupling pieces 276.

Guide sidewalls 273 are formed to be bent backward from both sides of a central portion of the front surface 272, and a guide rear surface 274 is formed to connect rear ends of both of the guide sidewalls 273.

As described, above, the guide sidewalls 273 and the guide rear surface 274 are formed on the front surface 272 so that a guide groove configured to vertically guide the locking member 600 is formed.

Holes are formed in the guide sidewalls 273 facing a return spring 620, and a support plate 275 configured to support a lower end of the return spring 620 is formed to be disposed under the holes.

A part of the guide sidewall 273 is cut and bent inward from the guide sidewall 273 to form the support plate 275.

A cable installation piece is formed to be disposed in a lower portion between both of the guide sidewalls 273 facing the return spring 620. A cable installation hole through which a cable 630 is installed is formed in the cable installation piece.

The locking member 600 has a bar shape which is vertically disposed and is disposed under a horizontal rod 103.

A support 610 is formed in an upper rear portion of the locking member 600, and the inclined surface 611 is formed on the front of the support 610.

Spring seating grooves 621 in which the return spring 620 is vertically disposed and has a coil shape are vertically formed at both sides of the locking member 600.

Inlet grooves 622 are formed at rear side portions of the locking member 600 to communicate with the spring seating grooves 621. When assembled, the support plate 275 may be inserted into the inlet grooves 622 so that the support plate 275 may be disposed inside the spring seating grooves 621.

A cable installation portion in which the cable 630 is installed is formed in a lower portion of the locking member 600. The locking member 600 is disposed to be surrounded by the guide sidewalls 273 of both sides of the second member 270 and the guide rear surface 274 so that the locking member 600 is vertically guided.

Hereinafter, operation of the conventional embodiment having the above described structure will be described.

When a user pulls the cable 630 using a lever connected to the cable 630, the locking member 600 moves downward with respect to the first member 100 and the second member 270. Accordingly, the support 610 which is supporting the horizontal rod 103 is removed so that locking is released. Accordingly, the headrest connected to the first member 100 is folded in a forward direction due to an elastic force of the main spring 300.

Meanwhile, when the locking member 600 moves downward, a gap between the support plate 275 and a portion of the locking member 600 which supports an upper end of the return spring 620 is decreased so that the return spring 620 is contracted. When a force of pulling the cable 630 is removed, the locking member 600 moves upward due to the return spring 620.

In a case in which the user stands the headrest upright, when the user pushes the headrest back with a force greater than the elastic force of the main spring 300, the headrest and the horizontal rod 103 rotates about a rotating shaft 301 so that the horizontal rod 103 moves rearward and downward. When the user continuously pushes the headrest back, the horizontal rod 103 comes into contact with the inclined surface 611 and slides downward along the inclined surface 611.

When the headrest stands completely upright, at least one portion of the inclined surface 611 of the support 610 is in contact with the horizontal rod 103 of the first member 100 so that the first member 100 and the support 610 enter a state in which the first member 100 are in close contact with the support 610. Accordingly, generation of a gap between the first member 100 and the support 610 is prevented. In addition, the elastic force of the return spring 620 is applied to the support 610 so that a state in which a portion protruding forward from the support 610 is in contact with the first member 100 is stably maintained.

However, since a rear surface side of the horizontal rod 103 is supportedly in contact with the inclined surface 611 of the support 610, additional bending is required to form the guide sidewalls 273 of both sides of the second member 270 and the guide rear surface 274.

In addition, since the locking member 600 vertically slides along wall surfaces of the guide groove formed between the guide sidewalls 273 and the guide rear surface 274, sliding friction and the like occur.

In addition, the locking member 600 should be formed through a die casting process due to a shape of the locking member 600, but it is difficult to manufacture the locking member 600, and since a gap is generated and an operational defect occurs when dimensions are unsatisfactory, tight management for the dimensions and the shape is required.

In addition, auxiliary plates 230 are integrally installed on a pipe at both sides of the horizontal rod 103 through a welding process and the like, and thus a work speed is decreased due to different welding directions, and double the assembly man-hours are required for riveting assembly work for the auxiliary plates 230.

DISCLOSURE OF INVENTION

Technical Problem

One aspect of the present invention provides a headrest folding device which has a simple structure in which a locking bar of a locking sliding member is disposed directly under a locking groove of an upper latch and is locked or unlocked and which also stably guides vertically linear sliding of a locking sliding member.

Solution to Problem

One aspect of the present invention provides a headrest folding device including a main bracket, being installed in one of a seat and a headrest, and including a front plate, a left plate, and a right plate, a stay being installed in another of the seat and the headrest, an upper latch, being supported by the left and right plates, being rotatable on the left and right plates due to a hinge part, and wherein a horizontal bar of the stay is fixed to the upper latch, a twist coil spring applying an elastic force to the stay in a folding direction toward the main bracket, a locking sliding member, being vertically slidably installed in the main bracket, and locking the upper latch in an unfolding direction, a pulling member pulling the locking sliding member in a downward direction to release locking, and a return spring configured to return the locking sliding member in the main bracket, wherein the locking sliding member includes a lifting slider receiving an elastic force from the return spring, a locking bar being locked in a state in which the locking bar supports the lifting slider and is positioned directly under locking grooves formed on a lower surface of the upper latch, and a guide portion guiding the locking bar to be movable upward or downward with respect to the main bracket. In the headrest folding device described in the present invention, the guide portion may include elongated holes being vertically formed in the left and right plates, wherein the locking bar is slidably disposed in the elongated holes.

In the headrest folding device described in the present invention, side elastic pieces being elastically pressed by the left and right plates may be further formed on a left side and a right side of the lifting slider.

In the headrest folding device described in the present invention, guide pieces being disposed in the elongated holes may be further formed on the left side and the right side of the lifting slider.

In the headrest folding device described in the present invention, a front elastic piece being elastically pressed by the front plate may be further formed on a front surface of the lifting slider.

In the headrest folding device described in the present invention, the guide pieces and the side elastic pieces may include cantilever type guide pieces and cantilever type side elastic pieces, vertically extending from free ends protruding outward from side surfaces of the lifting slider, and having arc shapes being convex outward, and the front elastic piece may include a cantilever type front elastic piece, vertically extending from the front surface of the lifting slider, and having an arc shape which is convex outward.

In the headrest folding device described in the present invention, the locking bar may be inserted into an insertion hole formed in an upper end of the lifting slider and may be disposed in the elongated holes.

In the headrest folding device described in the present invention, the return spring may be installed between an upper seat formed in the lifting slider and a lower seat formed on the front plate.

In the headrest folding device described in the present invention, a rear surface of the lifting slider may include a front-rear insertion groove into which a ball of the pulling member is inserted in a front-rear direction, a "C" shaped horizontal groove allowing the ball to move toward a center of the lifting slider from the front-rear insertion groove, and a vertical groove accommodating a cable of the pulling member connected to an end of the "C" shaped horizontal groove.

In the headrest folding device described in the present invention, the upper latch may include upper latch side plates disposed inside the side plates, hinge holes being formed in upper latch side plates, wherein the hinge part is supportedly inserted into the hinge holes, the locking grooves formed in the lower surfaces of the upper latch side plates, accommodation grooves, being formed in rear surfaces of the upper latch side plates, and accommodating the horizontal bar of the stay, and a connecting plate connecting the rear surfaces of the upper latch side plates except for the accommodation grooves, wherein the connecting plate and upper and lower portions of the horizontal bar of the stay may be fixedly welded.

In the headrest folding device described in the present invention, the lifting slider may be injection-molded.

Advantageous Effects of Invention

Effects of a headrest folding device according to the present invention will be described below.

Since a headrest is unfolded or folded as a locking bar assembled with an upper end of a lifting slider is inserted into or released from locking grooves formed in lower surfaces of the upper latch, locking can be performed even when a stay is not held from a front or rear thereof like a conventional headrest, and thus, a structure is simple. In addition, when the locking bar is pulled, the locking bar directly exits the locking grooves, and thus a release speed is very fast.

In addition, since side elastic pieces are further formed on side surfaces of the lifting slider, left and right movement of the lifting slider is prevented in a main bracket.

In addition, since guide pieces disposed in elongated holes are further formed on the side surfaces of the lifting slider, the lifting slider is prevented from rotating about and departing from the locking bar in forward and backward directions.

Particularly, since the guide pieces slide along the elongated holes and contact surfaces of front elastic pieces and side elastic pieces are decreased so as to be close to point contact surfaces, a hooking sensation of the lifting slider is minimized, and thus, an operating sensation is very excellent.

In addition, since the guide pieces are formed as the cantilever type guide pieces, when the lifting slider moves downward, parts of the guide pieces depart from the elongated holes and press side plates so that the guide pieces and the side elastic pieces form pressing points which are stably and vertically distributed.

In addition, since the front elastic pieces are further formed on a front surface of the lifting slider, when the lifting slider vertically slides, a gap is barely generated.

In addition, since the side elastic pieces and the front elastic pieces have ski shapes, that is, arc shapes which are convex outward, manufacturing thereof is simple, and a gap or abnormal operation is also prevented.

In addition, since a rear surface of the lifting slider includes a front-rear insertion groove into which a ball of a pulling member is inserted frontward or rearward, a "C" shaped horizontal groove which allows the ball to move to a center of the lifting slider from the front-rear insertion groove, and a vertical groove which accommodates a cable of the pulling member connected to the ball hooked on an end of the "C" shaped horizontal groove, the pulling member can be easily assembled or disassembled, and a weight of the lifting slider can also be decreased.

In addition, since a horizontal bar accommodated in accommodation grooves can be vertically welded to connecting plates in a single direction, workability is improved.

In addition, since the lifting slider is injection-molded, the weight thereof can be significantly decreased, and a gap prevention shaft, a cable assembly caulking process, a riveting process, and the like can also be removed.

MODE FOR THE INVENTION

Hereinafter, exemplary embodiments of the present invention will be described in detail with reference to the accompanying drawings.

For reference, components which are the same as the components of the conventional technology among components of the present invention will be referenced to the above described conventional technology, and detailed descriptions thereof will be omitted.

In addition, in the present invention, it will be described that a main bracket is installed in a seat and a headrest is installed in a stay. However, on the contrary, the present will also include that a headrest is installed in a seat and a main bracket is installed in a stay.

Figure 1:
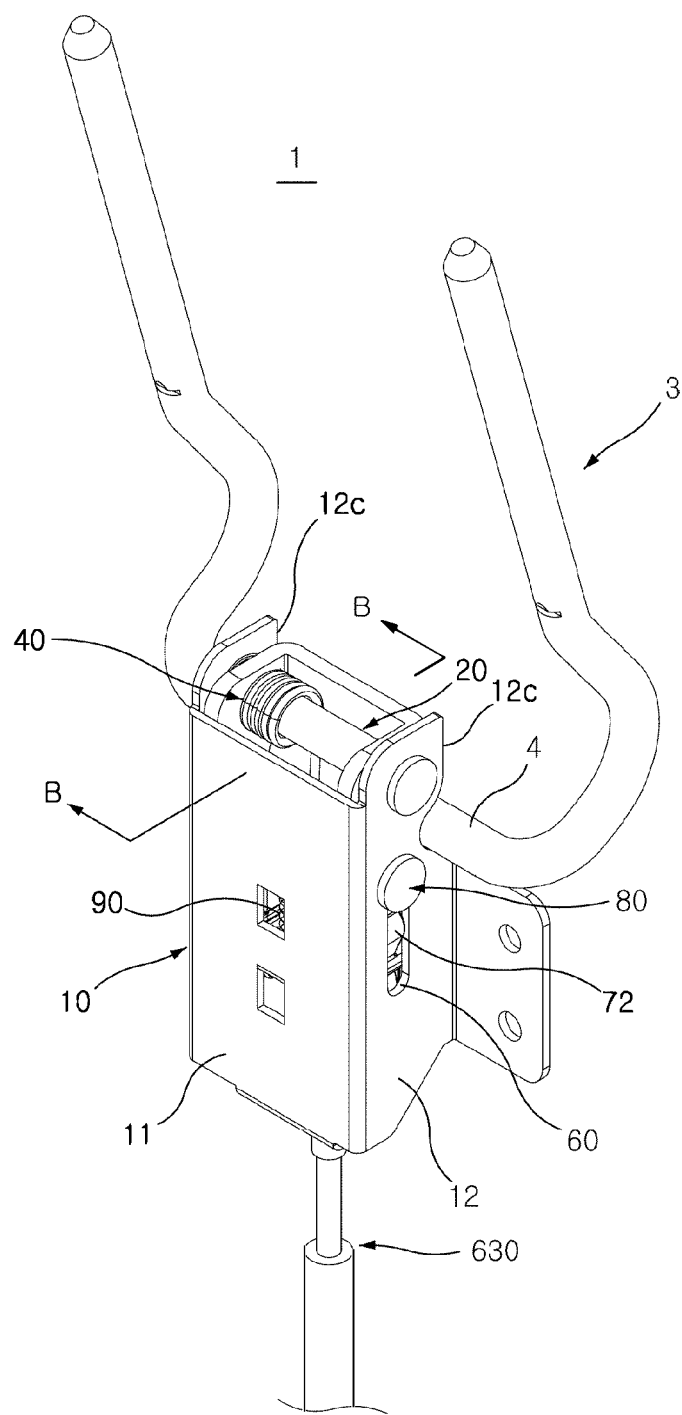
FIGS. 1 and 2 are front and rear perspective views illustrating a coupling state of a headrest folding device which is unfolded according to an exemplary embodiment of the present invention.
Figure 2:
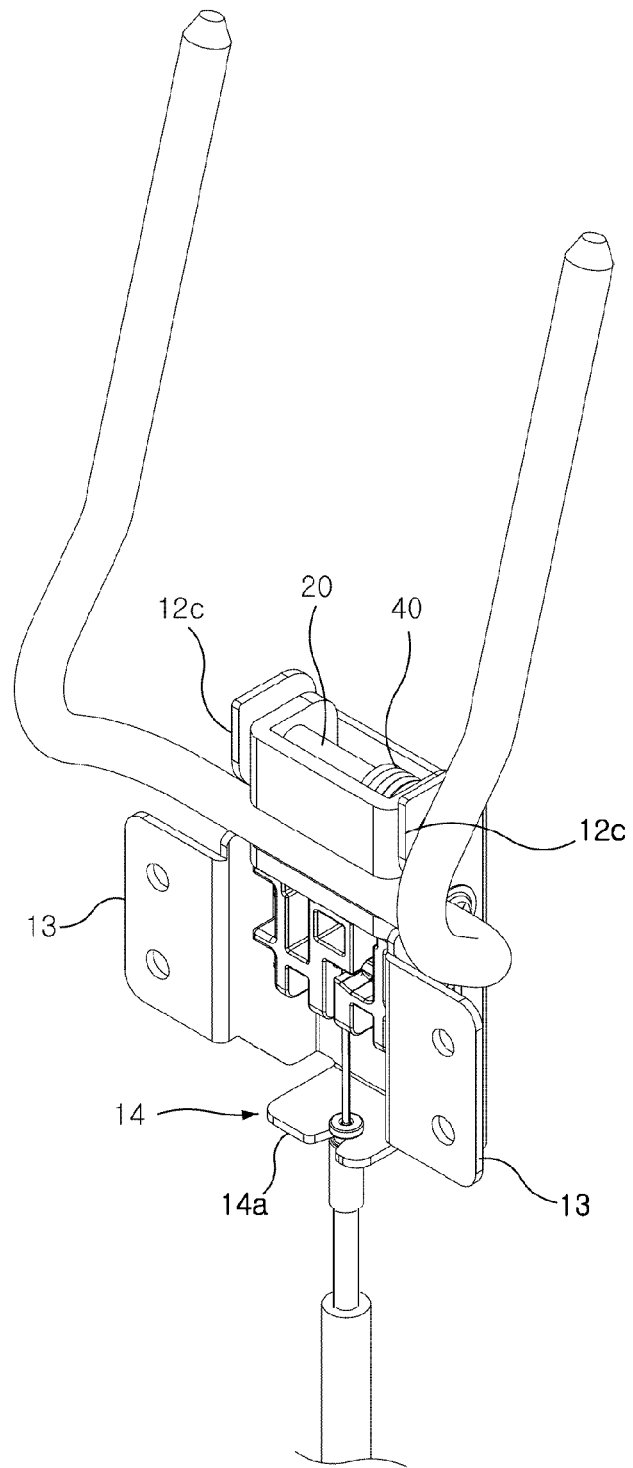
Figure 3:
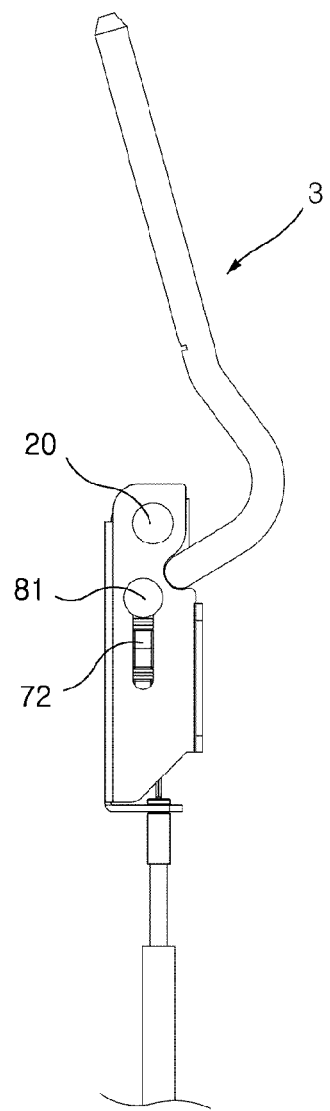
FIG. 3 is a side view of FIG. 1.
Figure 4:
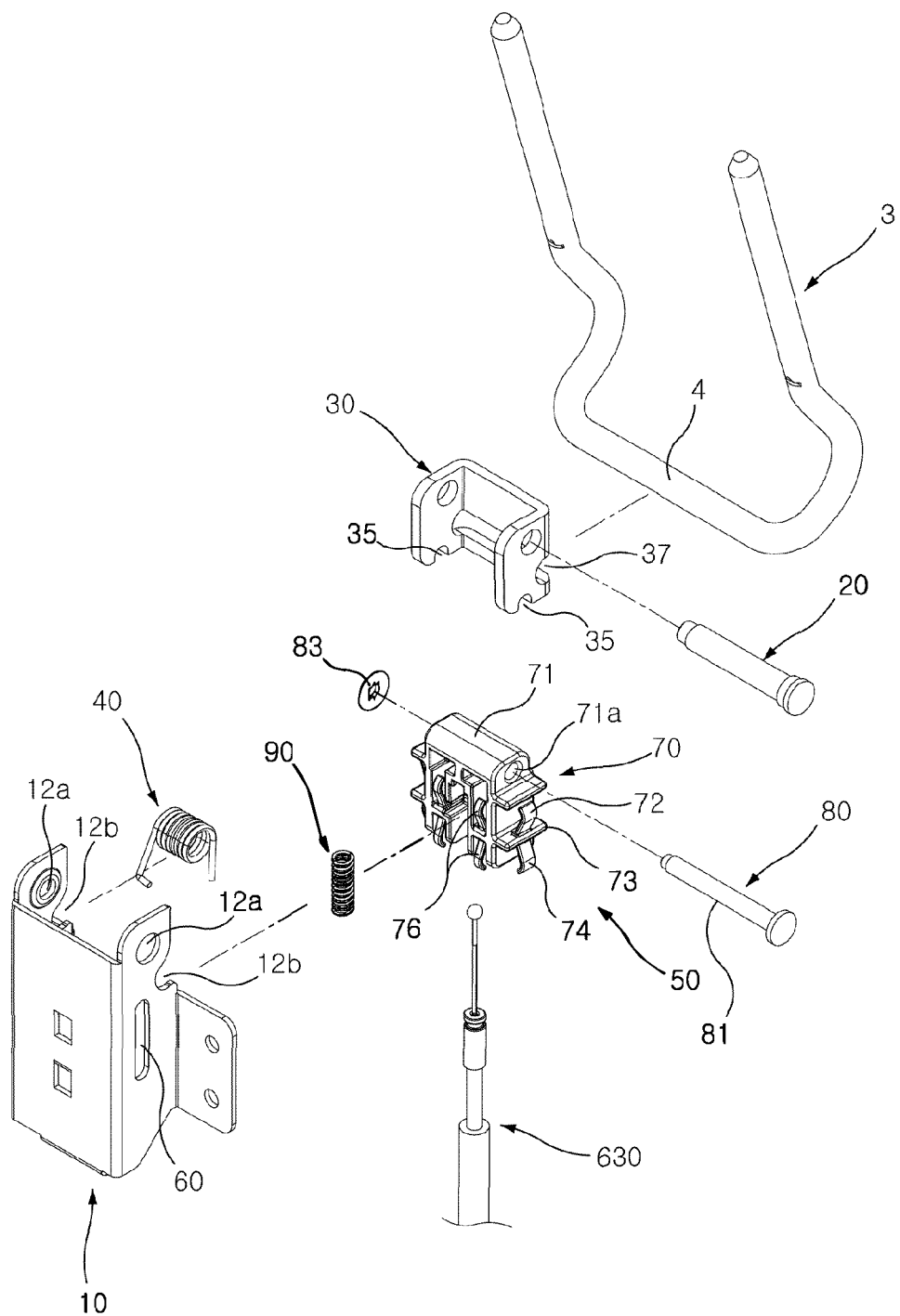
FIGS. 4 and 5 are exploded perspective views of FIGS. 1 and 2.
Figure 5:
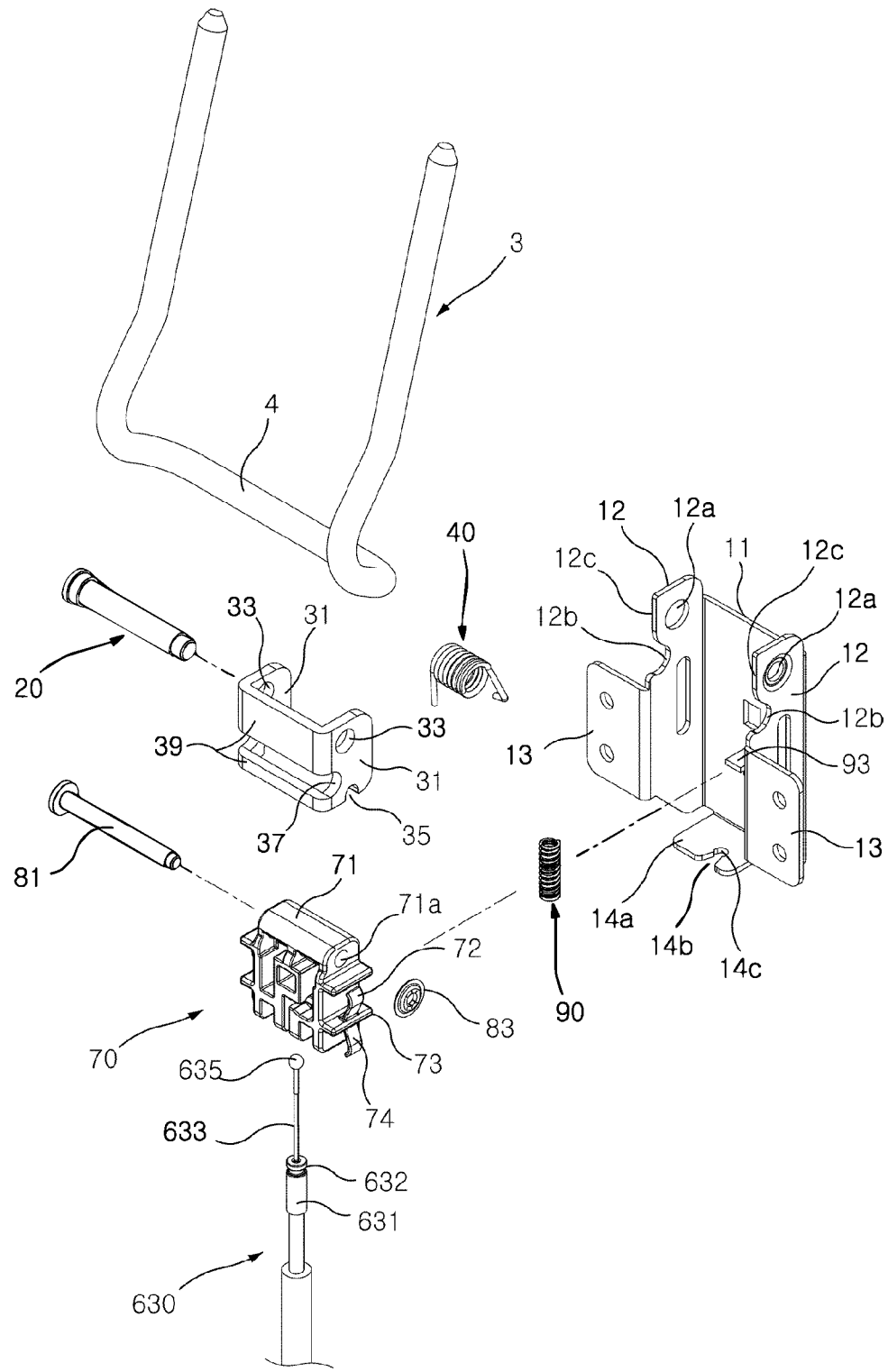
Figure 6:
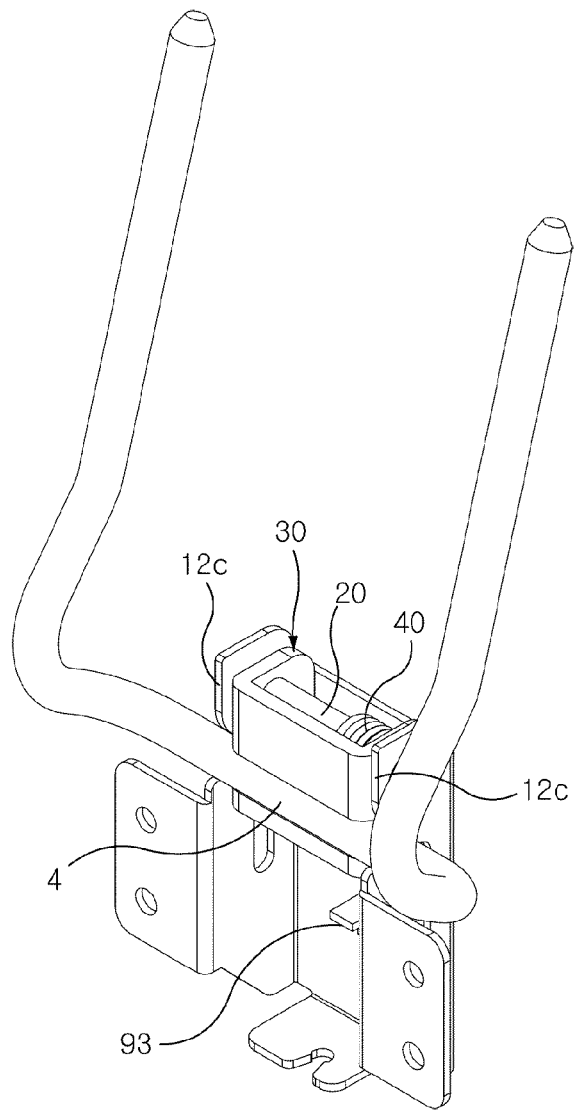
FIG. 6 is a perspective view illustrating an upper latch assembled with a main bracket.
Figure 7:
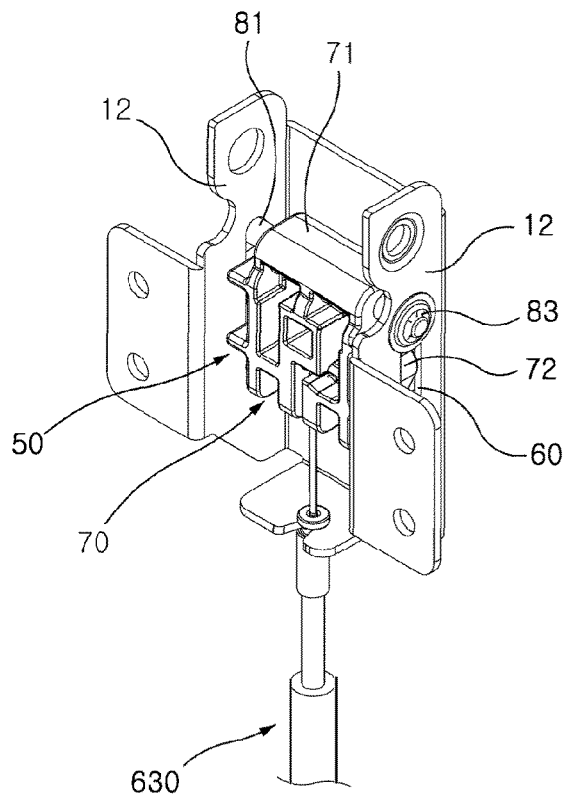
FIG. 7 is a perspective view illustrating a lifting slider assembled with the main bracket.
Figure 8:
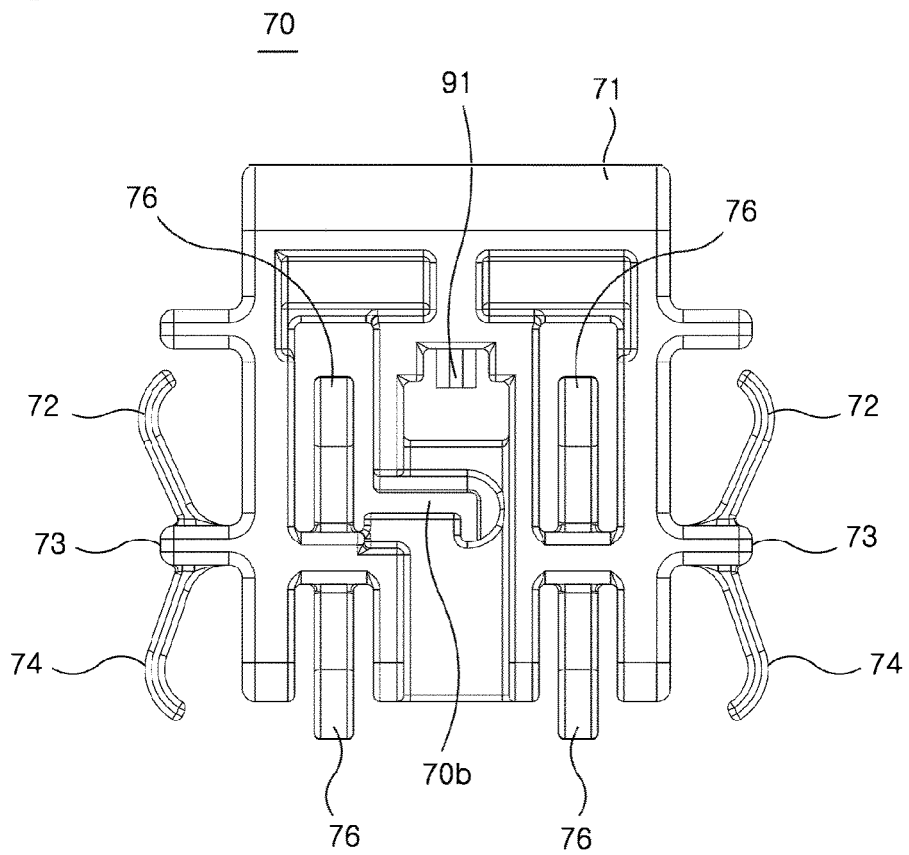
FIGS. 8 and 9 are front and rear views illustrating the lifting slider.
Figure 9:
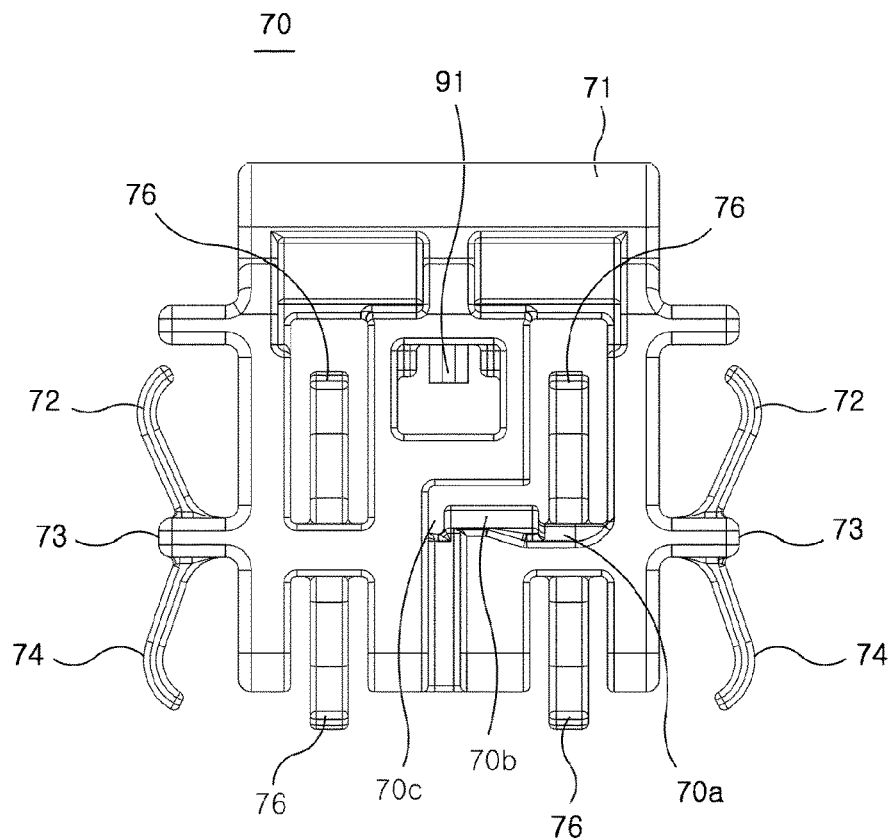
Figure 10:
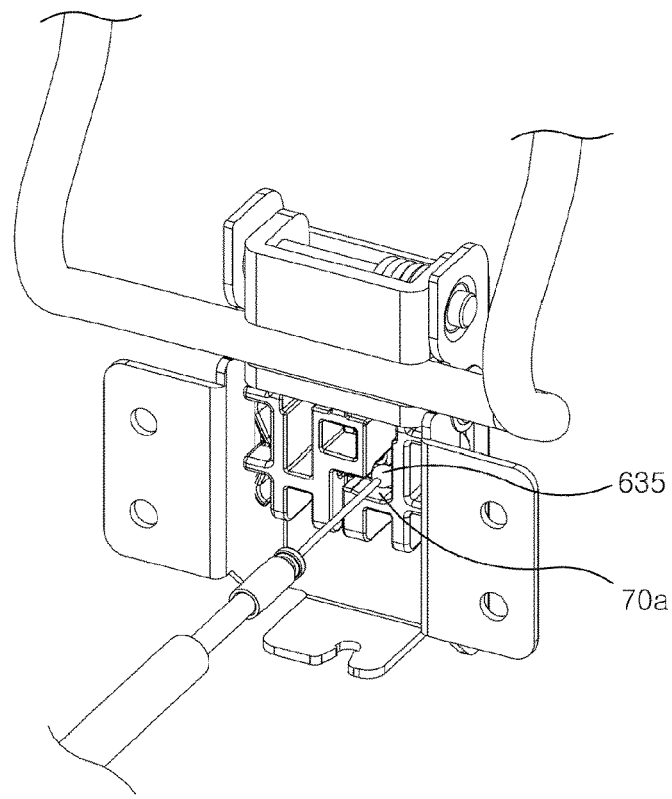
FIGS. 10, 11, and 12 are rear perspective views illustrating an order in which a pulling member is assembled with the lifting slider.
Figure 11:
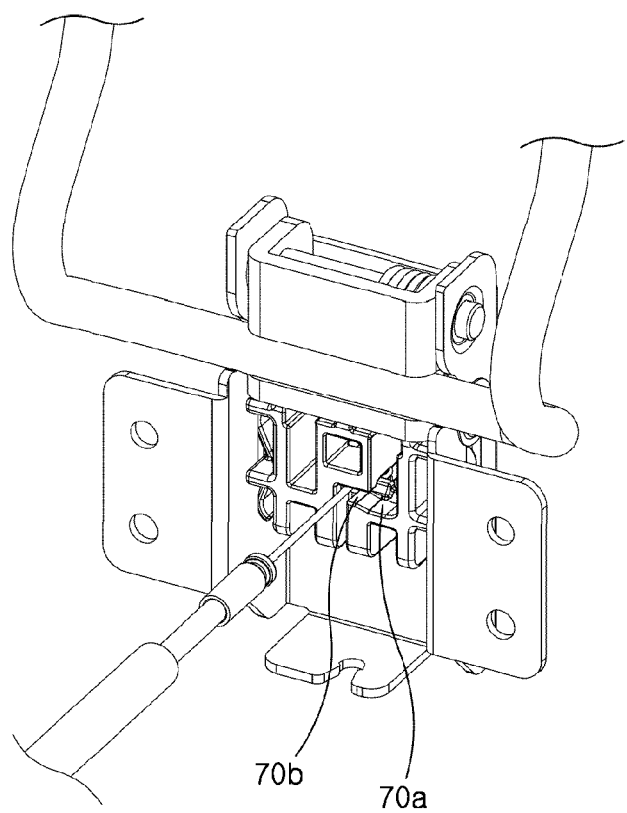
Figure 12:
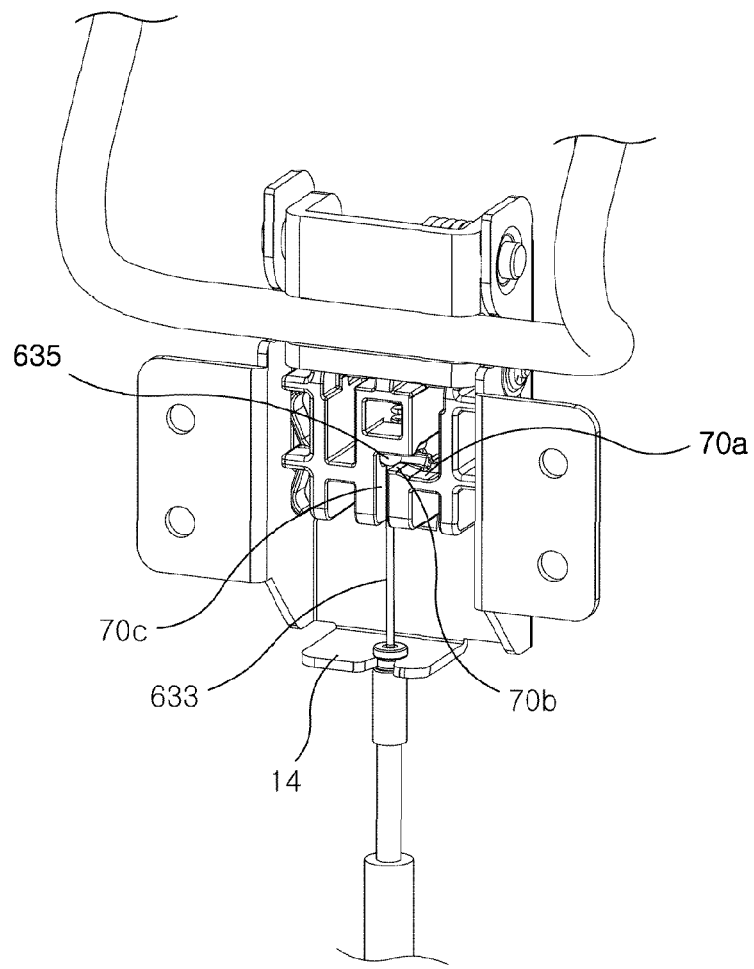
Figure 13:
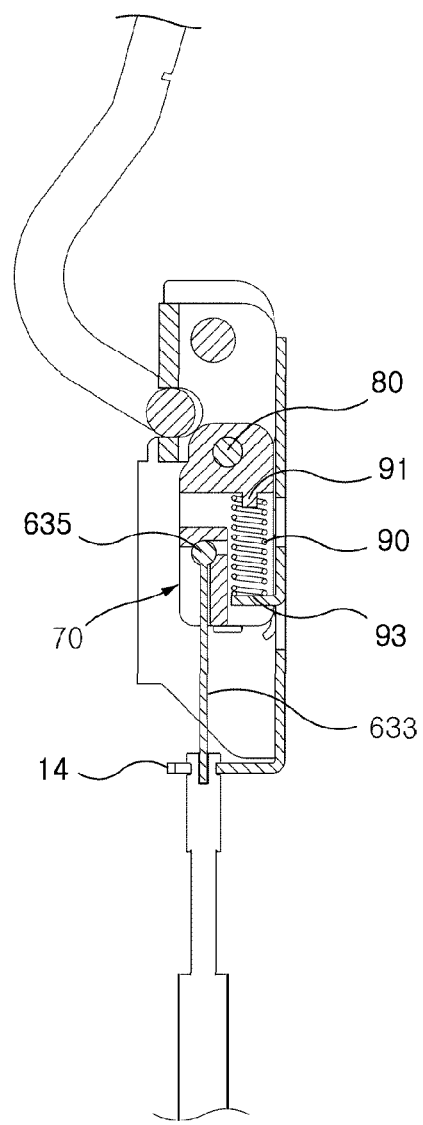
FIG. 13 is a cross-sectional view taken along line B-B of FIG. 1.
Figure 14:
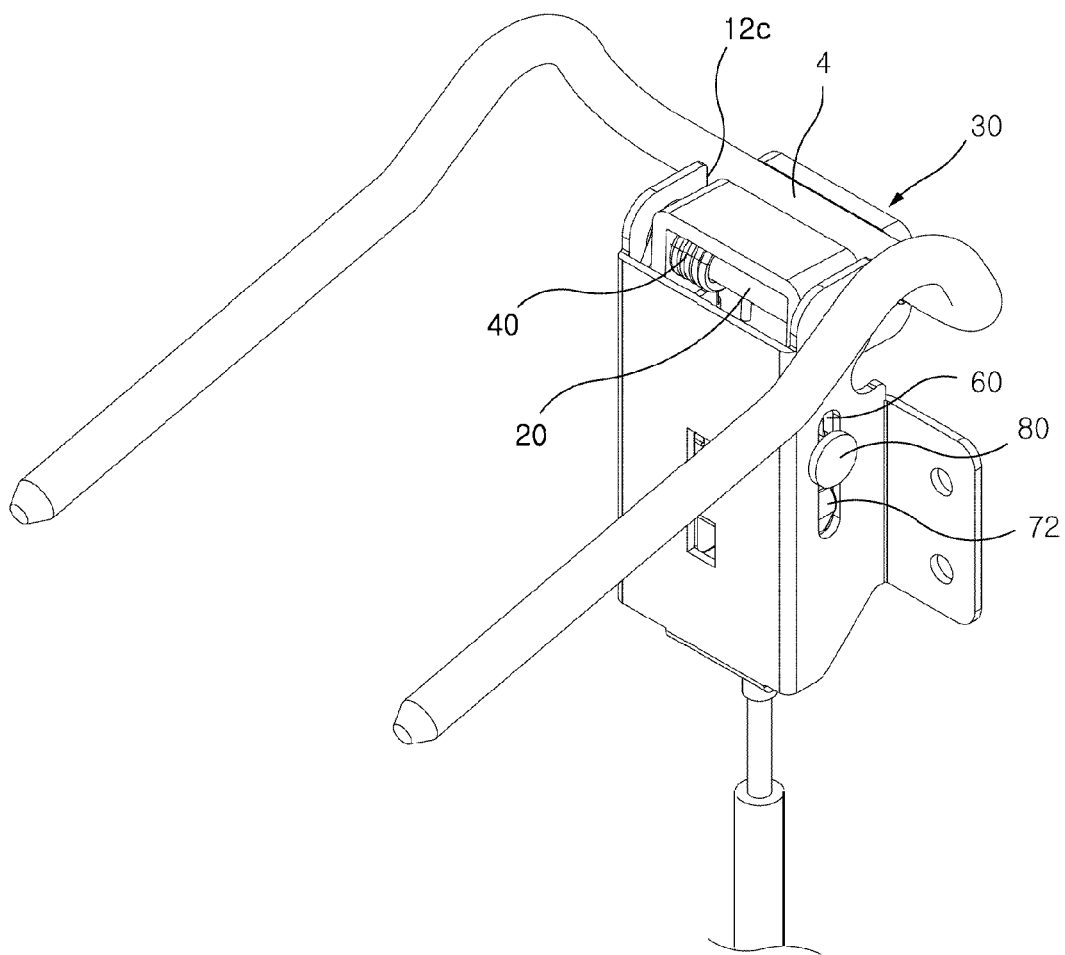
FIGS. 14 and 15 are front and rear perspective views illustrating a coupling state of the headrest folding device which is folded according to an exemplary embodiment of the present invention.
Figure 15:
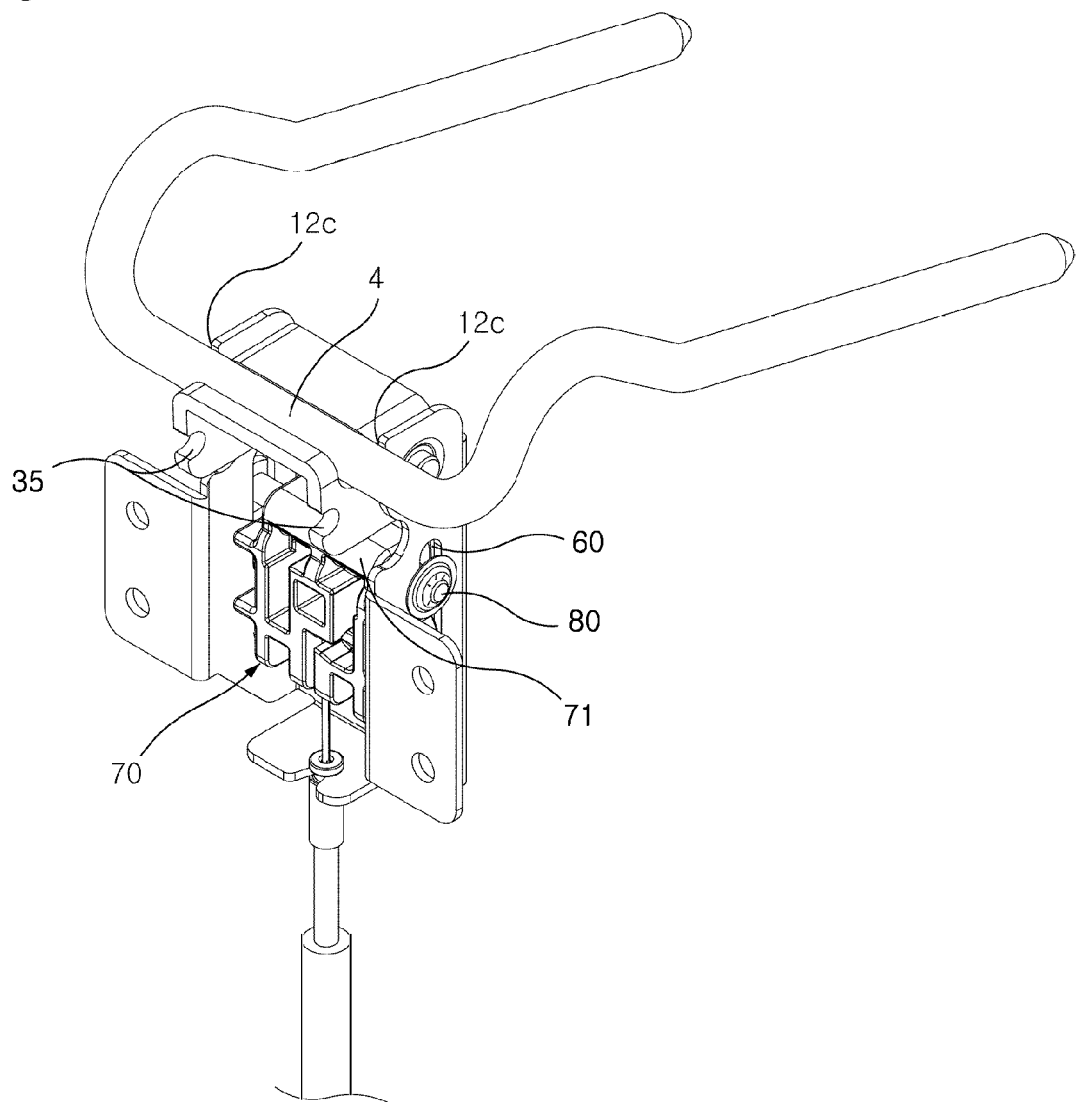
Figure 16:
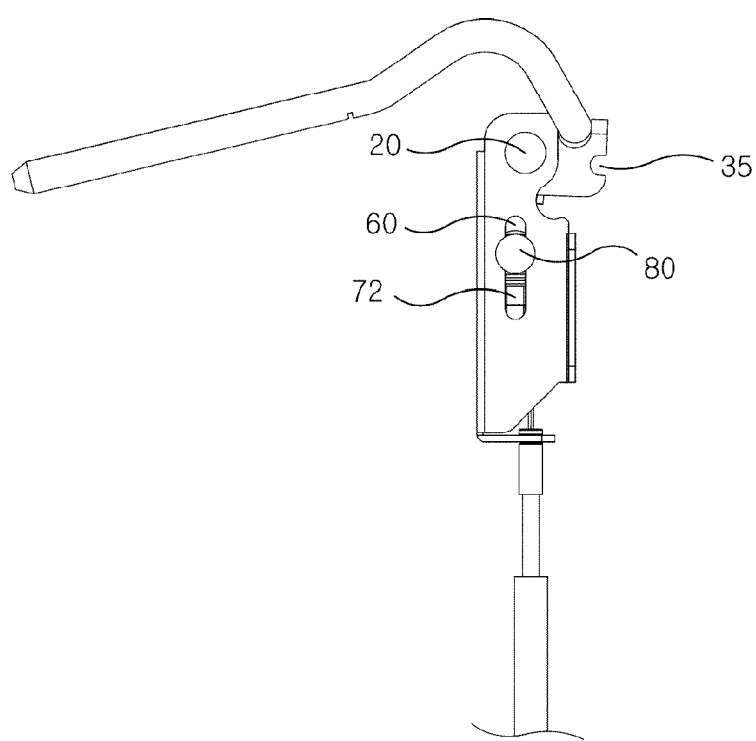
FIG. 16 is a side view of FIG. 14.
Figure 17:
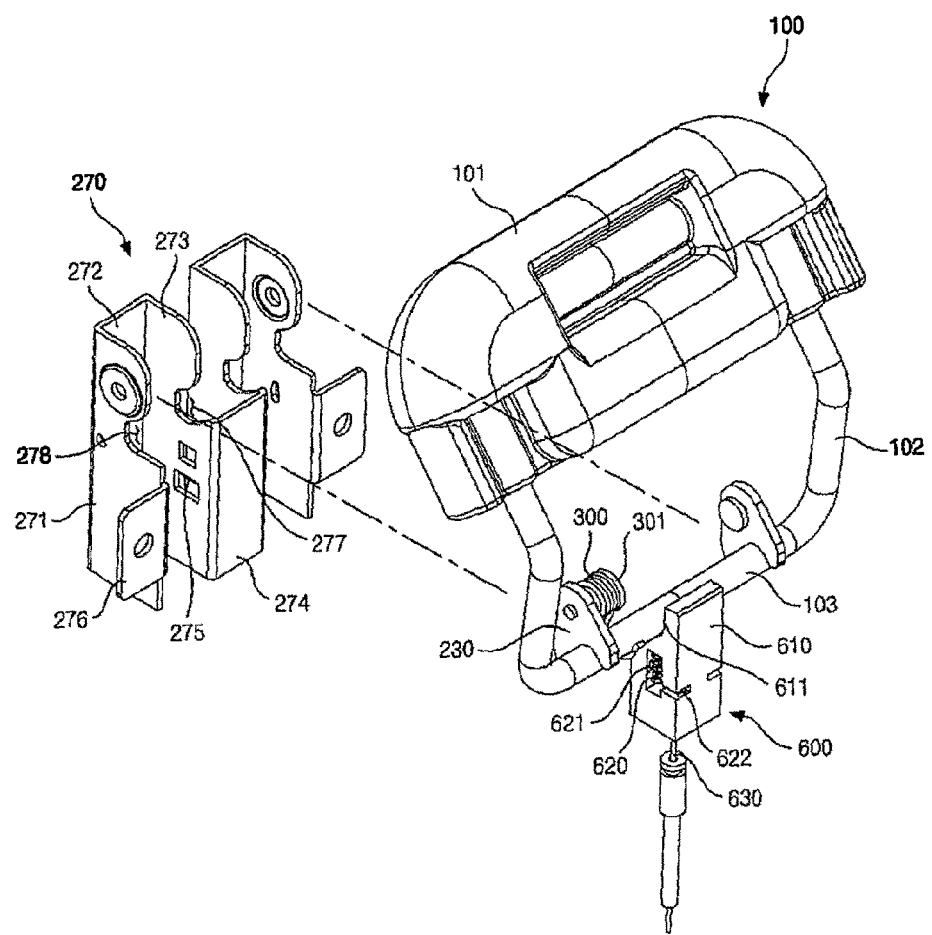
FIGS. 17 and 18 are exploded and coupled perspective views illustrating a conventional headrest folding device.
Figure 18:
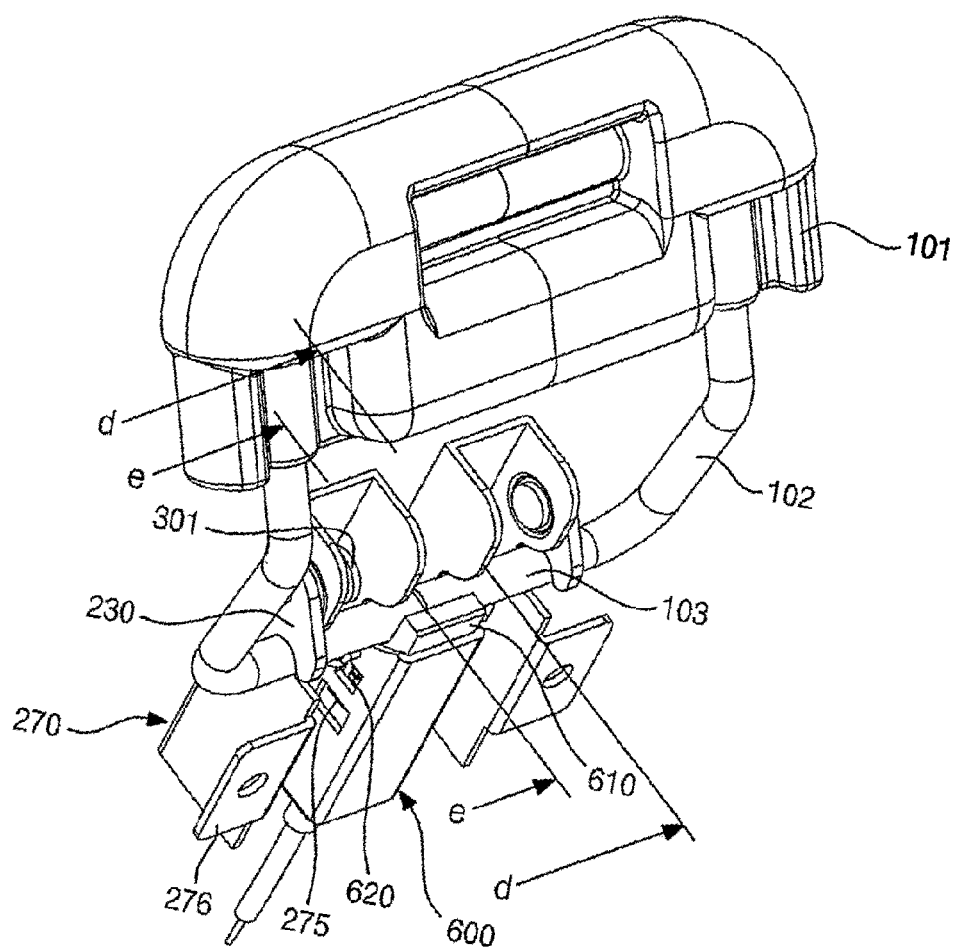
Figure 19:
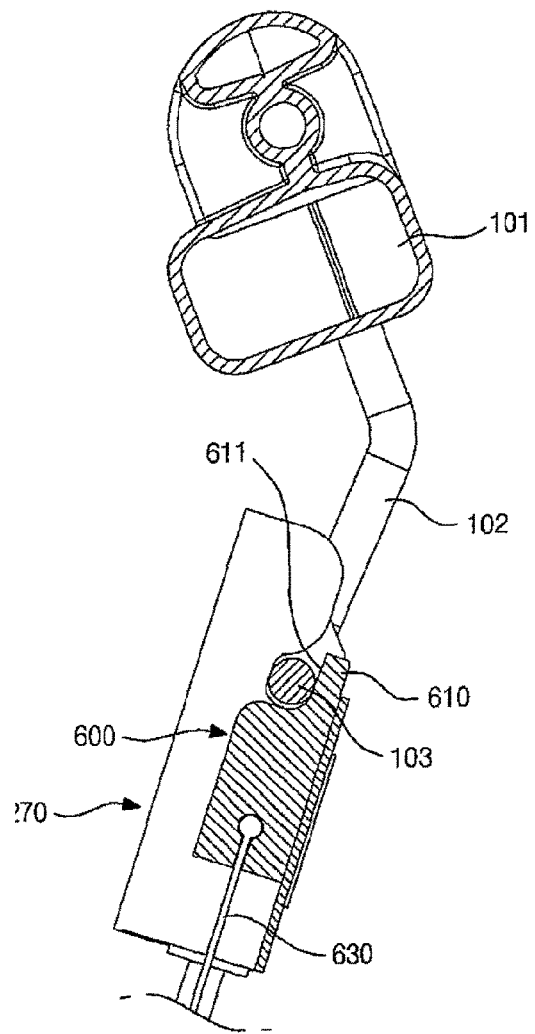
FIGS. 19 and 20 are cross-sectional views taken along lines d-d and e-e of FIG. 18.
Figure 20:
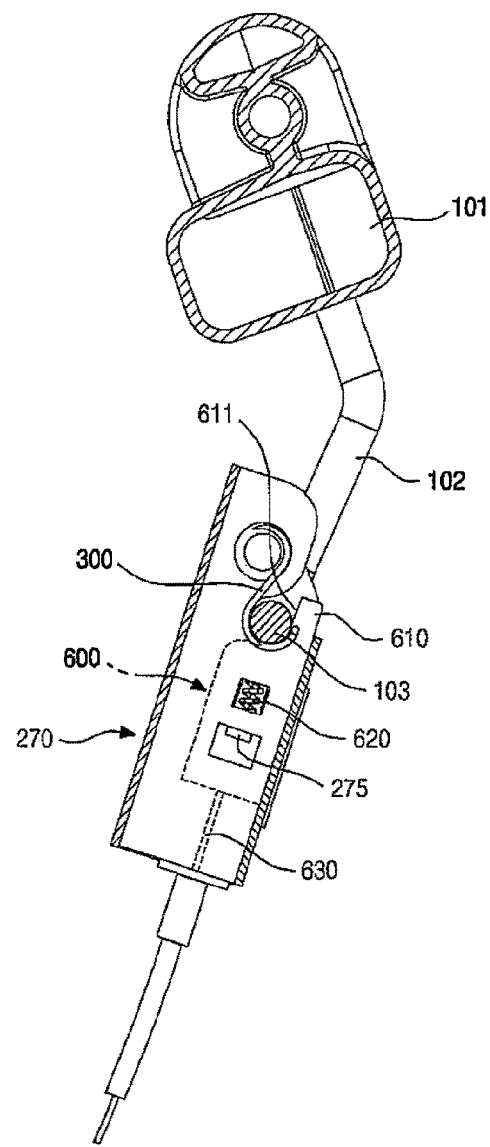
Figure 21:
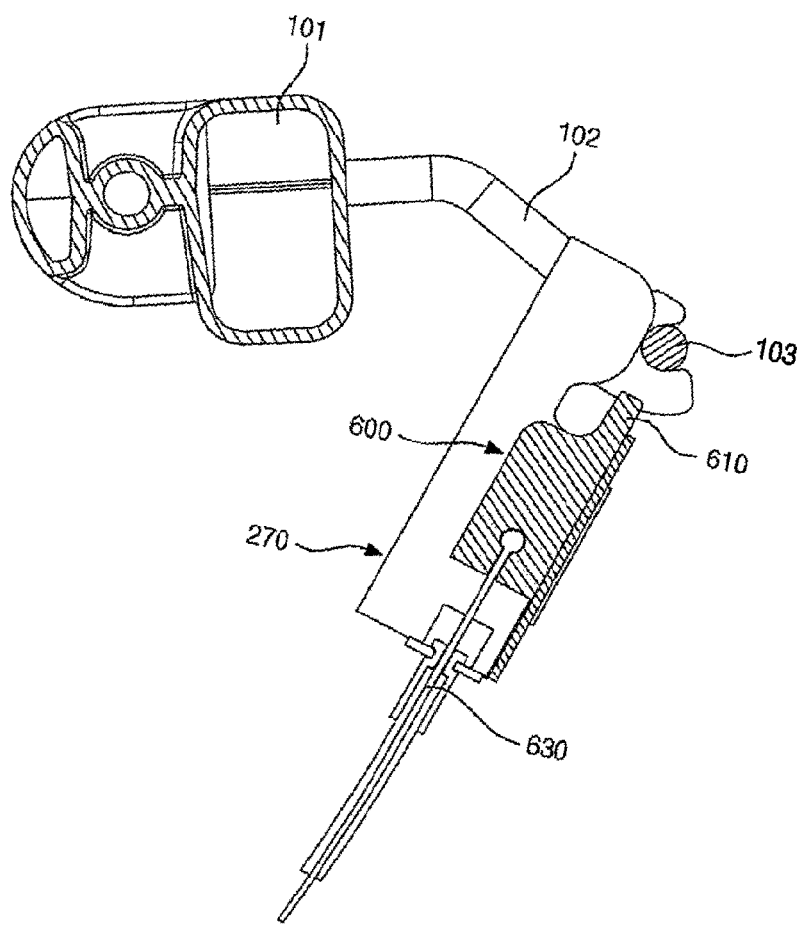
FIG. 21 is a cross-sectional view illustrating the headrest folding device at a folding position of FIG. 19.

FIGS. 1 and 2 are front and rear perspective views illustrating a coupling state of a headrest folding device which is unfolded according to an exemplary embodiment of the present invention, FIG. 3 is a side view of FIG. 1, FIGS. 4 and 5 are exploded perspective views of FIGS. 1 and 2, FIG. 6 is a perspective view illustrating an upper latch assembled with a main bracket, FIG. 7 is a perspective view illustrating a lifting slider assembled with the main bracket, FIGS. 8 and 9 are front and rear views illustrating the lifting slider, FIGS. 10, 11, and 12 are rear perspective views illustrating an order in which a pulling member is assembled with the lifting slider, FIG. 13 is a cross-sectional view taken along line B-B of FIG. 1, FIGS. 14 and 15 are front and rear perspective views illustrating a coupling state of the headrest folding device which is folded according to the exemplary embodiment of the present invention, and FIG. 16 is a side view of FIG. 14.

As illustrated in FIGS. 1 to 5, a headrest folding device 1 according to the present embodiment includes a main bracket 10 installed in a seatback (not shown) or headrest (not shown), a stay 3 installed in the remaining one of the seatback (not shown) and the headrest (not shown), an upper latch 30 to which a horizontal bar 4 of the stay 3 is fixed in a state in which the upper latch 30 is supported by the main bracket 10 to be rotatable due to a hinge part 20, a twist coil spring 40 configured to apply an elastic force to the stay 3 in a folding direction toward the main bracket 10, a locking sliding member 50 configured to lock the upper latch 30 in a state in which the locking sliding member 50 is vertically and slidably installed in the main bracket 10, a pulling member 630 configured to pull the locking sliding member 50 in a downward direction, and a return spring 90 configured to return the locking sliding member 50 to the main bracket 10.

As illustrated in FIGS. 4 and 5, the main bracket 10 includes a front plate 11, left and right plates 12 formed to be bent backward from left and right sides of the front plate 11, left and right coupling plates 13 bent outward from the left and right plates 12, and a lower plate 14 formed to be bent backward from a lower side of the front plate 11.

The front plate 11 and the left and right plates 12 are formed to have a "⊏" shape when viewed from above.

The left and right plates 12 and the left and right coupling plates 13 are formed in pairs.

Coupling holes are formed in the left and right coupling plates 13.

Hinge holes 12a into which the hinge part 20 is supportedly inserted are formed in upper sides of the left and right plates 12.

In addition, the hinge holes 12a are formed in the left and right plates 12 which protrude further upward than an upper end of the front plate 11.

In addition, as illustrated in FIGS. 14 and 15, rear end surfaces 12c of the left and right plates 12, which are positioned to correspond to the hinge holes 12a, serve as hooking steps on which the horizontal bar 4 of the stay 3 is hooked to stop at a folded position.

Seating grooves 12b on which the horizontal bar 4 of the stay 3 seats are formed in upper rear end surfaces of the left and right plates 12.

The seating grooves 12b are formed as grooves inclined upward to have outlines along which the horizontal bar 4 rotates.

The seating grooves 12b are disposed slightly below and behind the hinge holes 12a.

As illustrated in FIG. 2, a hooking piece 14a on which a cable arrangement rod 631 of the pulling member 630 is hooked is formed in the lower plate 14.

The hooking piece 14a is formed to have a groove having a "C" shape when viewed from above and includes an entrance groove 14b and a hooking groove 14c.

A small diameter rod 632 is formed in an outer circumferential surface of the cable arrangement rod 631 by forming a groove along a circumference thereof, and when the small diameter rod 632 enters the entrance groove 14b and is inserted into the hooking groove 14c, upper and lower portions thereof having diameters greater than that of the small diameter rod 632 are hooked on the hooking groove 14c.

The pulling member 630 includes a cable 633, a ball 635, and the arrangement rod 631 which arranges the cable 633 (see FIG. 5).

As illustrated in FIGS. 4 and 5, the hinge part 20 has a rivet shape, the hinge part 20 is inserted into the hinge holes 12a, and an end of the hinge part 20 is riveted so that the hinge part 20 serves as a hinge shaft.

That is, the hinge part 20 is installed in the hinge holes 12a in a state in which the hinge part 20 is supportedly inserted into hinge holes 33 formed in the upper latch 30 rotatably disposed in the main bracket 10.

Accordingly, the upper latch 30 rotates about the hinge part 20 as if swinging.

The twist coil spring 40 is installed around a shaft rod of the hinge part 20 in a state in which the twist coil spring 40 is fitted to the shaft rod.

One end and the other end of the twist coil spring 40 are supported by both of the main bracket 10 and the upper latch 30.

Accordingly, when locking is released, the twist coil spring 40 applies an elastic force to the upper latch 30 such that the upper latch 30 rotates with respect to the main bracket 10 in the folding direction.

However, the headrest is pushed with a force greater than the elastic force of the folding direction of the twist coil spring 40 and is locked to unfold the headrest.

As illustrated in FIGS. 4 and 5, the upper latch 30 includes left and right upper latch side plates 31 disposed inside the front plate 11 and the left and right plates 12, the hinge holes 33 which are formed in the left and right upper latch side plates 31, and into which the hinge part 20 is supportedly inserted, locking grooves 35 formed in lower surfaces of the left and right upper latch side plates 31, accommodation grooves 37 which are formed in rear end surfaces of the left and right upper latch side plates 31 and accommodate the horizontal bar 4 of the stay 3, and connecting plates 39 which connect the rear end surfaces of the left and right upper latch side plates 31 except for the accommodation grooves 37.

Due to the above described structure, since the connecting plates 39 are welded to upper and lower portions of the horizontal bar 4 in a single direction in a state in which the horizontal bar 4 is accommodated in the accommodation grooves 37, workability is high.

As illustrated in FIG. 7, the locking sliding member 50 includes a lifting slider 70, a locking bar 80 which is locked in the locking grooves 35 formed in the lower surfaces of the upper latch 30 in a state in which the locking bar 80 supports the lifting slider 70, and guide portions 60 which support the locking bar 80 such that the locking bar 80 is slidable with respect to the main bracket 10.

The guide portions 60 are elongated holes 60 vertically formed in the left and right plates 12 of the main bracket 10 and having slot shapes.

The lifting slider 70 is an injection molding product having a tetragonal shape.

The locking bar 80 is formed as a shaft like a bolt inserted into an insertion hole 71a formed at an upper end 71 of the lifting slider 70.

As illustrated in FIGS. 8 and 9, guide pieces 72 which are slidably disposed in the elongated holes 60 and side elastic pieces 74 elastically pressed by the left and right plates 12 are formed at left and right sides of the lifting slider 70.

In this case, the guide pieces 72 and the side elastic pieces 74 are cantilever type guide pieces 72 and the cantilever type side elastic pieces 74 which vertically extend from free ends of protruding pieces 73 protruding outward from side surfaces of the lifting slider 70 and have arc shapes which are convex outward.

In addition, front elastic pieces 76 elastically pressed by the front plate 11 are formed on a front surface of the lifting slider 70.

In this case, the front elastic pieces 76 are cantilever type front elastic pieces 76 vertically extending from the front surface of the lifting slider 70 and having arc shapes which are convex outward.

The cantilever type guide pieces 72, the cantilever type side elastic pieces 74, and the cantilever type front elastic pieces 76 are elastically pressed by the front plate 11 and the side plates 12 to prevent the lifting slider 70 from being spaced apart from the front plate 11 and the side plates 12 when the lifting slider 70 slides vertically.

Particularly, the cantilever type guide pieces 72 are disposed in the elongated holes 60 when locked, and when the cantilever type guide pieces 72 move to positions at which the locking is released, parts of the cantilever type guide pieces 72 are disposed in the elongated holes 60 and the remaining parts thereof are pressed by the side plates 12.

Since the cantilever type guide pieces 72 are positioned in the elongated holes during the locking or unlocking, lateral separation of the lifting slider 70 is prevented, and thus separation causing the lifting slider 70 to rotate about the locking bar 80 is prevented.

However, since the cantilever type guide pieces 72, the cantilever type side elastic pieces 74, and the front elastic pieces 76 are vertically distributed, side pressing and front pressing are not applied to one side so that stable sliding is guided.

As described above, since the locking grooves 35 are vertically collinear with the locking bar 80 when locked, when the locking bar 80 is pulled in a state in which the locking bar 80 firmly holds a force causing the upper latch 30 to rotate, a speed at which the locking is released may be significantly increased.

In addition, the cantilever type guide pieces 72, the cantilever type side elastic pieces 74, and the front elastic pieces 76 prevent movement of the lifting slider 70 and also precisely maintain a vertical direction of a stopper bar 81 inserted into the insertion hole 71a and the locking grooves 35 to consistently stably determine locking and unlocking positions.

The locking bar 80 includes the stopper bar 81 having a shaft shape and a push nut 83 coupled with an end of the stopper bar 81.

The stopper bar 81 is disposed in the elongated holes in a state in which the stopper bar 81 is inserted into the insertion hole 71a formed in the upper end 71 of the lifting slider 70.

Accordingly, as illustrated in FIG. 7, the stopper bar 81 inserted into the insertion hole 71a is inserted into the locking grooves 35 or released therefrom. That is, when the upper end 71 of the lifting slider 70 is accommodated inside the left and right upper latch side plates 31, the stopper bar 81 is inserted into the locking grooves 35 to maintain locking, which is an unfolded state.

Since the lifting slider 70 having such a structure is injection-molded, maintenance, such as replacement, is easy.

Meanwhile, as illustrated in FIGS. 8 and 9, a rear surface of the lifting slider 70 includes a front-rear insertion groove 70a into which the ball 635 of the pulling member 630 is inserted in a front-rear direction, a "C" shaped horizontal groove 70b which allows the ball 635 to move to a center of the lifting slider 70 from the front-rear insertion groove 70a, and a vertical groove 70c accommodating the cable 633 of the pulling member 630 connected to the ball 635 hooked on an end of the horizontal groove 70b having the "C" shape.

Due to the front-rear insertion groove 70a, the "C" shaped horizontal groove 70b, and the vertical groove 70c, after the ball 635 is inserted into the front-rear insertion groove 70a as illustrated in FIG. 10, when the ball 635 is moved leftward along the "C" shaped horizontal groove 70b as illustrated in FIG. 11 and the pulling member 630 is assembled with the lower plate 14 as illustrated in FIG. 12, the cable 633 is completely assembled in a state in which the cable 633 is accommodated in the vertical groove 70c.

A cross section of the "C" shaped horizontal groove 70b has a "C" shape in which the ball 635 does not depart from the horizontal groove 70b in a rearward direction.

The pulling member 630 is disassembled by performing the assembly in reverse.

The return spring 90 is installed between an upper seat 91 formed in the lifting slider 70 and a lower seat 93 formed on the front plate 11.

The lower seat 93 is a plate formed by cutting and bending a part of the front plate 11.

Hereinafter, operation of the present embodiment having the above described structure will be described.

As illustrated in FIGS. 1 to 3, when the stay 3 is positioned in an unfolded position (upright position) and a user pulls down the pulling member 630, the locking bar 80 of the lifting slider 70 is moved down along the elongated holes 60.

Accordingly, at a moment at which the locking bar 80 of the lifting slider 70 exits and departs the locking grooves 35 of the upper latch 30, the upper latch 30 rotates about the hinge part 20 due to an elastic force of the twist coil spring 40, and when the upper latch 30 rotates until the horizontal bar 4 comes into contract with a rear end surface 12c, the stay 3 is completely folded as illustrated in FIGS. 14 to 16.

When the stay 3 is completely folded and the pulling member 630 is released, the lifting slider 70 moves upward due to the return spring 90 until the locking bar 80 is hooked on upper ends of the elongated holes 60, and the lifting slider 70 stops.

When the user pulls the stay 3 in a backward direction to change a folded state of FIGS. 14 to 16 to an unfolded position of FIGS. 1 to 3, the upper latch 30 also rotates together with the stay 3, slightly pushes the locking bar 80 in the downward direction, and rotates until the locking grooves 35 are positioned direct above the locking bar 80, the lifting slider 70 which is slightly pushed moves upward to an original position due to the return spring 90, and the locking bar 80 is inserted into the locking grooves 35 and is locked.

While the invention has been shown and described with reference to the exemplary embodiments thereof, various changes in form and details may be made by those skilled in the art without departing from the spirit and scope of the invention as defined by the appended claims.

For example, although it has been described and illustrated that the main bracket is installed in the seatback and the stay thereof is installed in the headrest in the present embodiment, on the contrary, it is clear to those skilled in the art that the main bracket is installed in the headrest and the stay is installed in the seatback.

REFERENCE NUMERALS

1: HEADREST FOLDING DEVICE, 3: STAY
4: HORIZONTAL BAR, 10: MAIN BRACKET
11: FRONT PLATE
12: LEFT AND RIGHT PLATES
12a, 33: HINGE HOLE, 12b: SEATING GROOVE
13: LEFT AND RIGHT COUPLING PLATES
14: LOWER PLATE
20: HINGE PART, 30: UPPER LATCH
31: UPPER LATCH SIDE PLATE, 35: LOCKING GROOVE
37: ACCOMMODATION GROOVE, 39: CONNECTING PLATES
40: TWIST COIL SPRING, 50: LOCKING SLIDING MEMBER
60: ELONGATED HOLE, 70: LIFTING SLIDER
70a: FRONT-REAR INSERTION GROOVE
70b: "C" SHAPED HORIZONTAL GROOVE
70c: VERTICAL GROOVE, 72: GUIDE PIECE
74: SIDE ELASTIC PIECE, 76: FRONT ELASTIC PIECE
80: LOCKING BAR, 90: RETURN SPRING
630: PULLING MEMBER, 631: ARRANGEMENT ROD
633: CABLE, 635: BALL

What is claimed is:
1. A headrest folding device comprising:
a main bracket, being installed in one of a seat and a headrest, and including:
a front plate;
a left plate; and
a right plate;
a stay being installed in another of the seat and the headrest;
an upper latch, being supported by the left and right plates, being rotatable on the left and right plates due to a hinge part, and wherein a horizontal bar of the stay is fixed to the upper latch;

a twist coil spring applying an elastic force to the stay in a folding direction toward the main bracket;

a locking sliding member, being vertically slidably installed in the main bracket, and locking the upper latch in an unfolding direction;

a pulling member pulling the locking sliding member in a downward direction to release locking; and a return spring configured to return the locking sliding member in the main bracket, wherein the locking sliding member includes:

a lifting slider receiving an elastic force from the return spring;

a locking bar being locked in a state in which the locking bar supports the lifting slider and is positioned directly under locking grooves formed on a lower surface of the upper latch; and a guide portion guiding the locking bar to be movable upward or downward with respect to the main bracket.

2. The headrest folding device of claim 1, wherein the guide portion includes elongated holes being vertically formed in the left and right plates, wherein the locking bar is slidably disposed in the elongated holes.

3. The headrest folding device of claim 2, wherein side elastic pieces being elastically pressed by the left and right plates are further formed on a left side and a right side of the lifting slider.

4. The headrest folding device of claim 3, wherein guide pieces being slidably disposed in the elongated holes are further formed on the left side and the right side of the lifting slider.

5. The headrest folding device of claim 4, wherein a front elastic piece being elastically pressed by the front plate is further formed on a front surface of the lifting slider.

6. The headrest folding device of claim 5, wherein:

the guide pieces and the side elastic pieces include cantilever type guide pieces and cantilever type side elastic pieces, vertically extending from free ends protruding outward from side surfaces of the lifting slider, and having arc shapes being convex outward; and the front elastic piece includes a cantilever type front elastic piece, vertically extending from the front surface of the lifting slider, and having an arc shape which is convex outward.

7. The headrest folding device of claim 2, wherein the locking bar is inserted into an insertion hole formed in an upper end of the lifting slider and is disposed in the elongated holes.

8. The headrest folding device of claim 7, wherein the return spring is installed between an upper seat formed in the lifting slider and a lower seat formed on the front plate.

9. The headrest folding device of claim 1, wherein a rear surface of the lifting slider includes:

a front-rear insertion groove into which a ball of the pulling member is inserted in a front-rear direction;

a "C" shaped horizontal groove allowing the ball to move toward a center of the lifting slider from the front-rear insertion groove; and a vertical groove accommodating a cable of the pulling member connected to an end of the "C" shaped horizontal groove.

10. The headrest folding device of claim 1, wherein the upper latch includes:

upper latch side plates disposed inside the left and right plates of the main bracket;

hinge holes being formed in upper latch side plates, wherein the hinge part is supportedly inserted into the hinge holes;

the locking grooves formed on the lower surfaces of the upper latch side plates;

accommodation grooves, being formed in rear surfaces of the upper latch side plates, and accommodating the horizontal bar of the stay; and a connecting plate connecting the rear surfaces of the upper latch side plates except for the accommodation grooves, wherein the connecting plate and upper and lower portions of the horizontal bar of the stay are fixedly welded.

11. The headrest folding device of claim 10, wherein the lifting slider is injection-molded.

* * * * *